US008275885B2

(12) United States Patent  (10) Patent No.: US 8,275,885 B2
Hu et al.  (45) Date of Patent: Sep. 25, 2012

(54) METHOD, APPARATUS AND SYSTEM FOR PROCESSING A SERIES OF SERVICE MESSAGES

(75) Inventors: Jin Feng Hu, Beijing (CN); Wei Lu, Beijing (CN); Rui Xiong Tian, Beijing (CN); Bo Yang, Beijing (CN); Ce Yu, Tianjin (CN)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 12/026,969

(22) Filed: Feb. 6, 2008

(65) Prior Publication Data

US 2008/0195718 A1    Aug. 14, 2008

(30) Foreign Application Priority Data

Feb. 6, 2007 (CN) .......................... 2007 1 0006577

(51) Int. Cl.
*G06F 15/16* (2006.01)
*G06F 15/173* (2006.01)
*G06F 15/177* (2006.01)
(52) U.S. Cl. ........................................ 709/226; 709/217
(58) Field of Classification Search ................... 709/226
See application file for complete search history.

(56) References Cited

U.S. PATENT DOCUMENTS

| | | | |
|---|---|---|---|
| 6,449,618 B1 * | 9/2002 | Blott et al. | 707/999.101 |
| 6,496,831 B1 * | 12/2002 | Baulier et al. | 707/101 |
| 6,502,133 B1 * | 12/2002 | Baulier et al. | 709/224 |
| 6,901,409 B2 | 5/2005 | Dessloch et al. | 707/103 Y |
| 2002/0152106 A1 * | 10/2002 | Stoxen et al. | 705/8 |
| 2003/0093402 A1 | 5/2003 | Upton | 707/1 |
| 2004/0154016 A1 * | 8/2004 | Randall | 718/1 |
| 2006/0031536 A1 * | 2/2006 | Eydelman et al. | 709/228 |
| 2006/0036682 A1 | 2/2006 | Fletcher et al. | 709/203 |
| 2006/0129546 A1 * | 6/2006 | Braun et al. | 707/4 |
| 2006/0209695 A1 * | 9/2006 | Archer et al. | 370/235 |
| 2007/0058533 A1 * | 3/2007 | Forissier et al. | 370/230 |

FOREIGN PATENT DOCUMENTS

CN   1300988 A    6/2001
EP   1265130 A2   12/2002

* cited by examiner

*Primary Examiner* — Haresh N Patel
*Assistant Examiner* — Chau Le
(74) *Attorney, Agent, or Firm* — Ido Tuchman; William J. Stock (57) ABSTRACT

A method, apparatus and system for processing of a series of service messages. In one embodiment, the series of service messages is formed by a plurality of service messages, and at least two server instances provide real-time processing of the service messages and store the information provided by the service messages and results obtained from processing the service messages. The method includes the steps of: determining an activity that affects real-time processing of the service messages will occur in at least one server instance of the server instances; and dispatching subsequent service messages among the service messages to other server instance(s) other than the at least one server instance, so as to ensure that said activity will not affect message processing delay.

16 Claims, 4 Drawing Sheets

METHOD, APPARATUS AND SYSTEM FOR PROCESSING A SERIES OF SERVICE MESSAGES

CROSS-REFERENCE TO RELATED APPLICATIONS

This application claims priority under 35 U.S.C. §119 to Chinese Patent Application No. 200710006577.3 filed Feb. 6, 2007, the entire text of which is specifically incorporated by reference herein.

BACKGROUND OF THE INVENTION

The present invention relates to the field of information technology, and more particularly, to a method, apparatus and system for processing of a series of service messages. Usually, a session (or dialog) consists of one or more transactions. A transaction consists of a request message and zero, one or more response message(s). So session (or dialog) messages consist of a series of service messages which can be categorized into one or more interrelated request/response pairs.

Real-time services are required in some important industries, such as telecom industry and bank industry. For example, a typical requirement in telecom industry is that 95th percentile of response time should be less than 20 ms and the maximum response time should be less than 40 ms.

"Real-time" does not just mean processing fast, but means "the ability to respond to a real-world event reliably and predictably." So "Real-time" is more concerned about timing than speed.

When an application that needs to be served in real-time is implemented using a normal Java platform, the major difficulty is to control the execution of the application predictably. One reason is the unpredictability of automatic memory management (garbage collection) of the Java platform.

To enable the adoption of Java technology in the field of real time processing, Sun Microsystems, Inc. released the Java Real Time System (Java RTS) that is a commercial implementation of the Real Time Specification for Java (RTSJ). Java RTS enables developers of real-time applications to take full advantage of the Java language ecosystem while maintaining the predictability of the execution of real time applications.

On the other hand, IBM Corp. provides a new real-time garbage collector named Metronome. With Metronome, the pause time of message processing caused by garbage collection is below 1 ms even in the worst case.

Although the Java RTS and the Metronome can improve the predictability of service message processing delay, they decrease the throughput of service messages dramatically.

Therefore, there is a need to provide a solution in the field of real-time processing, so as to improve the predictability of service message processing delay while maintaining the relatively high throughput of service messages.

BRIEF SUMMARY OF THE INVENTION

The object of an embodiment of the present invention is to provide a solution such that the predictability of service message processing delay can be improved while the relatively high throughput of service messages is maintained when implementing real-time applications on normal JVM (Java virtual machine).

To achieve the object, an aspect of the present invention proposes a method for processing of a series of service messages that is formed by a plurality of service messages, wherein at least two server instances provide real-time processing of said series of service messages and store the information provided by said series of service messages and results obtained from processing said series of service messages. Said method comprises the steps of: determining an activity that affects real-time processing of said series of service messages will occur in at least one server instance of said at least two server instances; dispatching subsequent service messages among said series of service messages to other server instance(s) other than said at least one server instance, so as to ensure that said activity will not affect message processing delay.

An embodiment of the present invention further provides an apparatus for processing of a series of service messages that is formed by a plurality of service messages, wherein at least two server instances provide real-time processing of said series of service messages and store the information provided by said series of service messages and results obtained from processing said series of service messages. Said apparatus comprises: a scheduler for determining an activity that affects real-time processing of said series of service messages will occur in at least one server instance of said at least two server instances; and a dispatcher for dispatching subsequent service messages among said series of service messages to other server instance(s) other than said at least one server instance, so as to ensure that said activity will not affect message processing delay.

Additionally, an embodiment of the present invention further provides a system for processing of a series of service messages that is formed by a plurality of service messages, wherein at least two server instances provide real-time processing of said series of service messages and store the information provided by said series of service messages and results obtained from processing said series of service messages, and in each of said at least two server instances, memory is managed by virtual machine. Said system comprises: a scheduler for determining an activity that affects real-time processing of said series of service messages will occur in at least one server instance of said at least two server instances; a route policy database for storing route policies, after it is determined that an activity that affects real-time processing of said series of service messages will occur in at least one server instance of said at least two server instances, said scheduler modifies route policies in said route policy database so as to prevent subsequent service messages from being dispatched to said at least one server instance; a dispatcher for dispatching subsequent service messages among said series of service messages to other server instance(s) other than said at least one server instance by accessing the route policy database, so as to ensure that said activity will not affect message processing delay; at least two virtual machine monitors located in each of said at least two server instances respectively and for providing to said scheduler information that is used for determining an activity that affects real-time processing of said series of service messages will occur in at least one server instance of said at least two server instances; and an in-memory database for storing the information provided by said series of service messages and results obtained from processing said series of service messages.

Another embodiment of the present invention further provides a computer program product for implementing the method described above.

According to an embodiment of the present invention, with elaborate scheduling of the dispatch of service messages, preventing service messages from being dispatched to a server instance where an activity that will affect the real-time processing of service messages occurs, the impact of the activity on real-time processing of service messages can be eliminated, while the dramatic decrease of the throughput of service messages, which will occur if other methods for improving service message processing delay are employed, can be avoided.

BRIEF DESCRIPTION OF THE SEVERAL VIEWS OF THE DRAWINGS

Other objects and effects of the present invention will become more apparent and easy to understand from the following description, taken in conjunction with the accompanying drawings wherein.

Similar reference numerals designate the same, similar, or corresponding features or functions throughout the drawings.

DETAILED DESCRIPTION OF THE INVENTION

An embodiment of the present invention is applicable to the case in which at least two server instances provide the same service, such as the case in which each of said at least two server instances provides the service as a SIP (Session Initiation Protocol) application server instance. The basic idea of the present invention is to dispatch subsequent service messages to other server instance(s) other than the at least one server instance of said at least two server instances when an activity that will affect real-time processing of service messages will occur in said at least one server instance, such as garbage collection is needed or overhead fluctuation occurs, so as to ensure the real-time processing of service messages.

In this manner, with elaborate scheduling of the dispatching of service messages, preventing service messages from being dispatched to a server instance where an activity that will affect the real-time processing of service messages occurs, the impact of said activity on real-time processing of service messages can be eliminated, while the relatively high throughput of service messages is maintained.

Hereinafter, embodiments of the present invention will be described in terms of SIP message processing on JVM (Java virtual machine). Of course, those skilled in the art should understand that the present invention is not limited thereto. For example, the present invention is also applicable to the situation of .NET, i.e., the situation in which SIP messages are processed on a .NET platform.

SIP is a signaling protocol proposed by the Internet Engineering Task Force (IETF) in 1999. For the details of SIP, please refer to IETF RFC 3261 which is incorporated into the present application by reference here.

As a basic session control protocol, SIP becomes more and more popular in telecom next-generation networks (NGN) and IT collaborative solutions. Moreover, according to SIP, a session may comprise a plurality of transactions, and each of transactions may comprise a plurality of messages.

Of course, those skilled in the art should understand that the present invention is not limited to SIP and is applicable to any such protocols in which a session comprises a plurality of transactions, and each of transactions comprises a plurality of messages.

Figure 1:
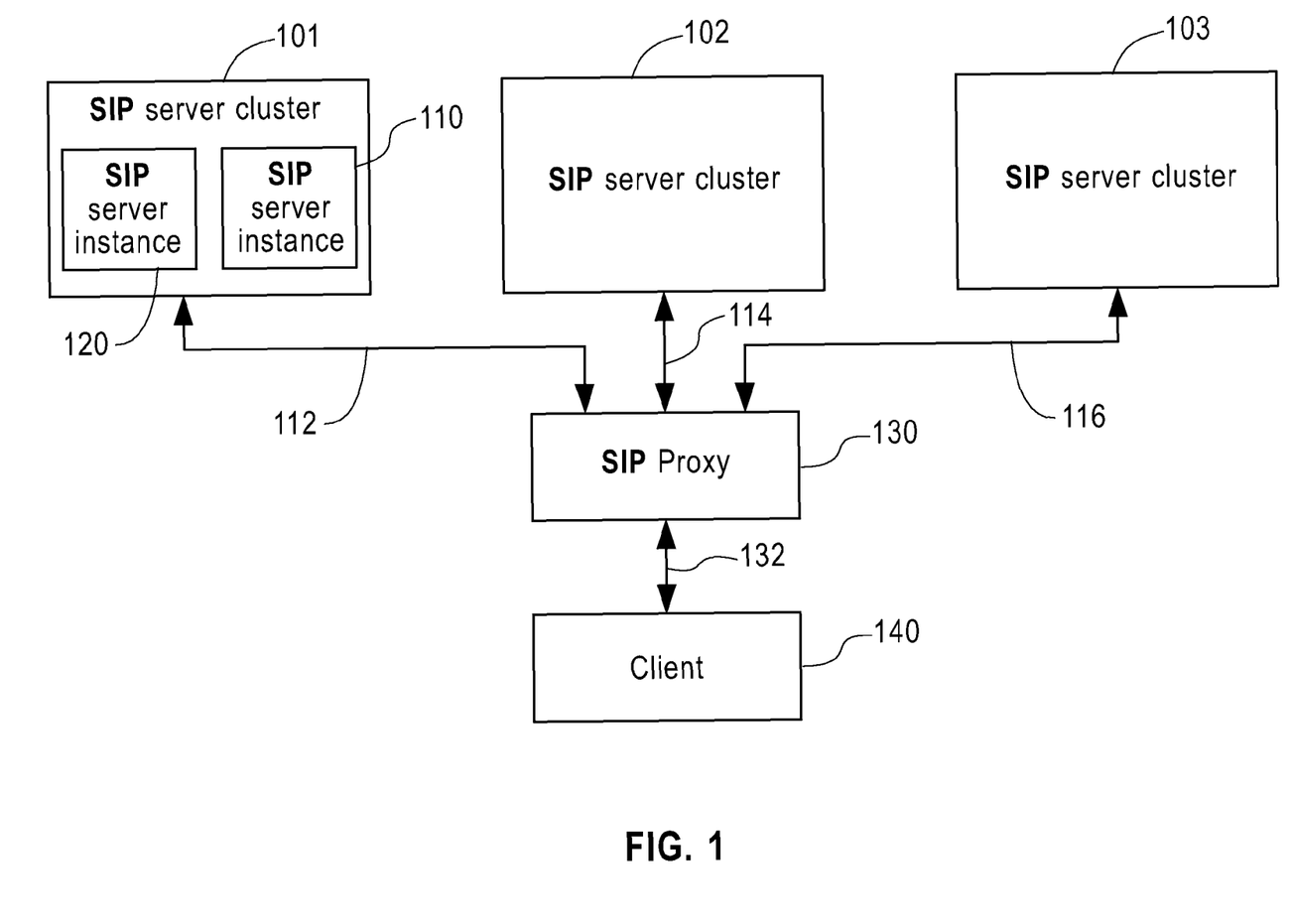
FIG. 1 depicts a service message processing system according to an embodiment of the present invention.

FIG. 1 depicts a service message processing system 100 according to an embodiment of the present invention. As depicted in FIG. 1, system 100 comprises application server clusters 101, 102 and 103, SIP application server instances 110 and 120, which are included in SIP application server cluster 101, a SIP proxy 130, and a client 140.

SIP application server instances 110 and 120 can process SIP messages concurrently. In other words, SIP application server instances 110 and 120 provide the same SIP application service, and SIP messages can be dispatched either to SIP application server instance 110 or to SIP application server instance 120. For the purpose of succinctness, only two SIP application server instances 110 and 120 are depicted in SIP application server cluster 101. However, those skilled in the art should understand that the present invention is not limited thereto and SIP application server cluster 101 may comprise more than two SIP application server instances. Also, SIP application server clusters 102 and 103 each may comprise two or more SIP application server instances. Likewise, the number of SIP application server clusters which system 100 may comprise is not limited to three. Additionally, in this embodiment, suppose SIP application server instances 110 and 120 are two physically separate server instances. Of course, those skilled in the art should understand that the present invention is not limited thereto and is also applicable to the situation in which SIP application server instances 110 and 120 are in the same server physically but are logically separate.

Additionally, in this embodiment, suppose SIP application server instances 110 and 120 are based on Java technology. In other words, SIP application server instances 110 and 120 process SIP messages on their respective JVMs.

SIP proxy 130 is between SIP application server clusters 101, 102, 103 and client 140. SIP proxy 130 is the entry for all traffic from client 140 to SIP application server clusters 101, 102, 103. SIP proxy 130 can perform many workload management operations, such as admission control, load balancing. In the present invention, the function of SIP proxy 130 is extended, as described in detail in the following.

Here, client 140 represents a plurality of client terminals and may comprise a SIP voice terminal, a SIP video terminal, etc.

SIP application server clusters 101, 102 and 103 are connected with SIP proxy 130 via links 112, 114 and 116, and SIP proxy 130 is connected with client 140 via a link 132. Links 112, 114 and 116 may be wired links, such as coaxial cables, optical fibers, etc. Additionally, link 132 may pass across a network (not depicted) which may be a wireless network, a wired network, or the combination thereof. Furthermore, the network may be a local area network, a metropolitan area network, a wide area network, or the combination thereof. For example, the network is the Internet.

As depicted in FIG. 1, SIP application server clusters 101, 102 and 103 are connected with SIP proxy 130 via point-to-point links. However, those skilled in the art should understand that SIP application server clusters 101, 102 and 103 may also be connected with SIP proxy 130 via a bus.

In this embodiment, SIP application server instances 110 and 120 process SIP messages concurrently. When SIP proxy 130 determines that one of SIP application server instances 110 and 120 needs to perform garbage collection, SIP proxy 130 switches the workload from the application server instance which is to perform garbage collection to the other application server instance. Here, the application server instance which is to perform garbage collection is called the "primary application server instance" (PS), and the application server instance that is not to perform garbage collection is called the "backup application server instance" (BS). The two SIP application server instances 110 and 120 may serve as PS or BS alternatively.

Figure 2:
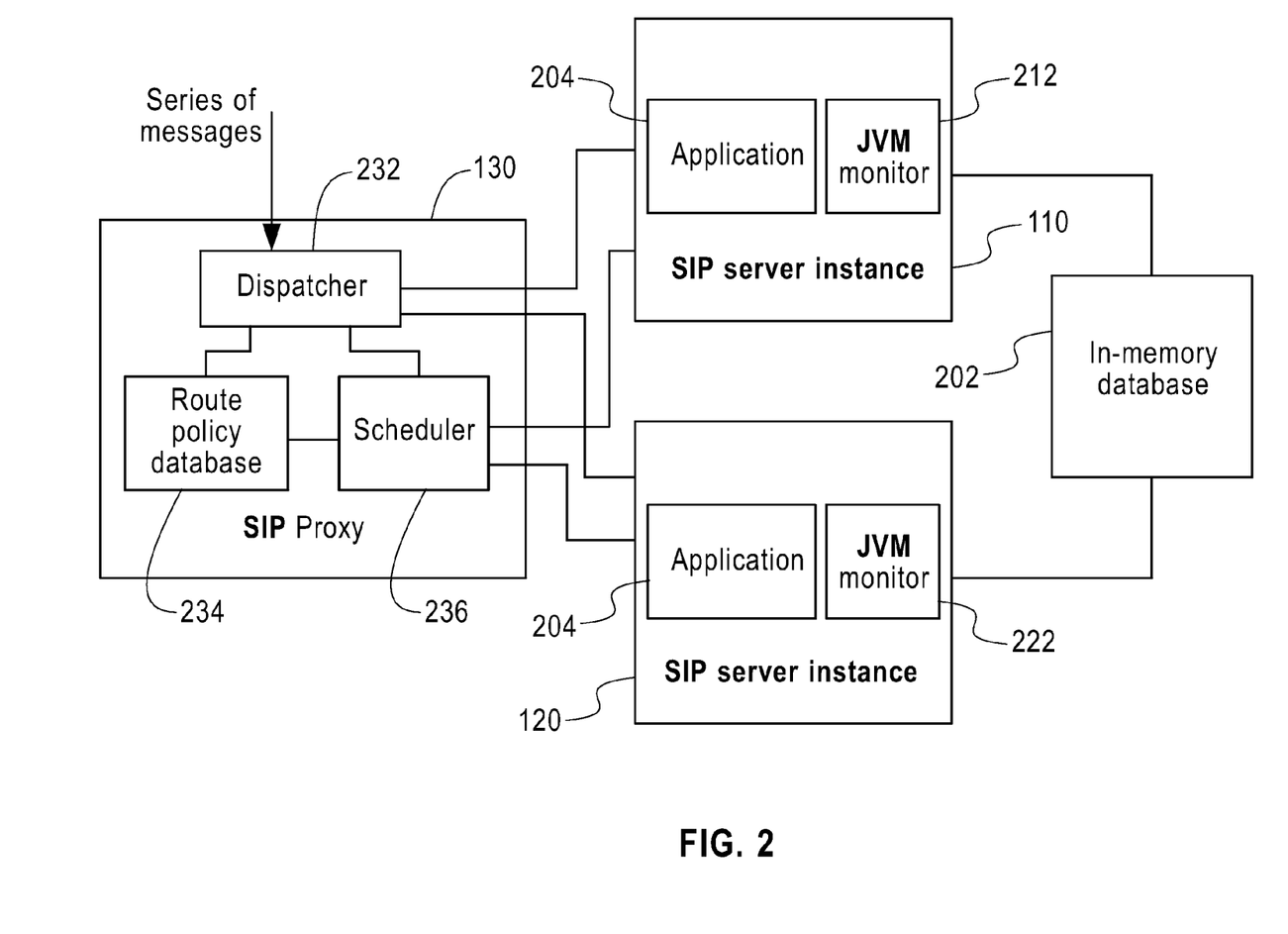
FIG. 2 depicts components contained in a service message processing system according to an embodiment of the present invention and signal flow relations among these components.

FIG. 2 depicts components comprised in a service message processing system according to an embodiment of the present invention and signal flow relations among these components. These components include: a scheduler 236, a dispatcher 232 and a route policy database 234, each of which is located in SIP proxy 130; JVM monitors 212 and 222, which are located in SIP application server instances 110 and 120 respectively; and an in-memory database 202 which is a process independent of SIP application server instances and can be located at the physical node where any one of SIP application server instances 110 and 120 is located or at the third-party physical node. Additionally, an application 204 can run in SIP application server instances 110 and 120 respectively and is written by Java language. More specifically, each of SIP application server instances 110 and 120 has a JVM, and both application 204 and JVM monitors 212, 222 are running on the JVMs.

Since the processing of subsequent messages of a SIP session will depend on the information provided by former messages or processing results and the information is kept in a session-related object, after workload is switched from PS to BS, BS should know the session-related object created and maintained in PS to process subsequent messages of the session that started in PS. Since the interchange of PS and BS roles is quite frequent (according to the frequency of garbage collection, generally once every several minutes), in-memory database 202 is employed in this embodiment to exchange the session-related object between PS and BS. Berkeley database or IBM's ObjectGrid can be utilized as in-memory database 202. The interaction between in-memory database 202 and PS, BS will be described below.

Hereinafter, an operating method of a service message processing system according to an embodiment of the present invention will be described with reference to FIG. 2.

Scheduler 236 in SIP proxy 130 periodically (e.g. every several seconds) synchronously queries JVM monitors 212 and 222 in SIP application server instances 110 and 120 for the memory usage of JVM.

If the memory usage of a JVM is above a threshold, e.g. above 80%, and the memory usage of the other JVM is below the threshold, then scheduler 236 determines that the JVM whose memory usage is above the threshold is to perform the activity of garbage collection, and the SIP application server instance where this JVM is located will serve as PS, while the SIP application server instance where the JVM with memory usage below the threshold is located will serve as BS.

Where the number of SIP application server instances providing the same service is more than two, if the memory usage of JVM of at least one SIP application server instance is above the threshold and the memory usage of JVM of at least one SIP application server instance is below the threshold, then scheduler 236 determines that the JVM of the at least one SIP application server instance with memory usage above the threshold is to perform the activity of garbage collection, and the at least one SIP application server instance where the JVM is located will serve as PS, while the at least one SIP application server instance where the JVM of at least one SIP application server instance with memory usage below the threshold is located will server as BS.

Then, scheduler 236 will update route policy database 234 in SIP proxy 130 or notify directly dispatcher 232 in SIP proxy 130 of the modification of route policies.

More specifically, scheduler 236 marks status of P S as temporarily unusable on a target application server instance list in the route policy database.

Afterwards, scheduler 236 periodically (e.g. every several seconds) queries PS (e.g. application 204 in the SIP application server instance that serves as PS) about the development of all the ongoing transactions on PS. Based thereon, scheduler 236 sends a command message to the JVM monitor on JVM of PS to trigger JVM to perform garbage collection. For example, after all the ongoing transactions on PS have completed, or the ongoing transactions on PS are less than a certain amount, scheduler 236 sends a command message to the JVM monitor on JVM of PS to trigger JVM to perform garbage collection. In an embodiment of the present invention, JVM on PS performs garbage collection. Of course, those skilled in the art should understand that the operating system on PS may perform garbage collection, and if other virtual machine other than JVM is employed, then the corresponding virtual machine performs garbage collection.

It should be understood that any type of JVM may be employed in SIP application server instances 110 and 120 and any garbage collection algorithms may also be employed in the present invention.

Next, scheduler 236 periodically (e.g. every several milliseconds) queries PS (e.g. its JVM monitor 204) whether garbage collection completes or not.

After garbage collection completes, scheduler 236 updates route policy database 234 by marking status of PS as usable on the target application server instance list in route policy database 234.

JVM monitors 212 and 222 respectively run on each JVM of SIP application server instances 110 and 120, monitoring the memory usage of JVM. Upon receipt of request for query about memory usage of JVM from scheduler 236, the JVM monitors 212 and 222 each performs query operation. The specification of Java 5.0 provides APIs to query the memory usage of JVM.

In an embodiment of the present invention, JVM monitor 212 or 222 invokes system.gc( ) to trigger garbage collection when it receives a command to perform garbage collection from scheduler 236.

Located on SIP proxy 130, route policy database 234 is controlled by scheduler 236 and used by dispatcher 232. More specifically, route policy database 234 includes a target application server instance list. As described previously, scheduler 236 may modify the target application server instance list in route policy database 234, for example, marks the status of an application server instance as temporarily unusable on the target application server instance list or marks the status of the application server instance as usable.

Those skilled in the art should understand that in the case described previously, what is modified by scheduler 236 is the status of an application server instance that has been added to the target application server instance list.

Of course, those skilled in the art should understand that it can be such that when determining an application server instance will serve as PS, scheduler 236 deletes this application server instance from the target application server instance list; after an application server instance completes garbage collection, scheduler 236 adds this application server instance to the target application server instance list.

Route policy database 234 is optional. In other words, it is also possible if there is no route policy database 234. When scheduler 236 determines that one JVM is to perform garbage collection, it will directly communicate this information to the dispatcher 232. In this manner, dispatcher 232 may not dispatch service messages to the SIP application server instance having JVM that is to perform garbage collection.

Before dispatching received service messages (all of these service messages come from client 140 and form a series of service messages) to SIP application server instances 110 and 120, dispatcher 232 queries route policy database 234 to determine to which one of SIP application server instances 210 and 220 service messages can be dispatched.

For example, if the status of SIP application server instance 110 is marked as usable on the target application server instance list in route policy database 234, then dispatcher 232 may dispatch service messages to SIP application server instance 110; if the status of SIP application server instance 110 is marked as temporarily unusable on the target application server instance list in route policy database 234, then dispatcher 232 cannot dispatch service messages to SIP application server instance 110.

The service message processing system according to an embodiment of the present invention has four states, namely a mutation state, a pre-garbage-collection state, a global garbage collection state and a post-garbage-collection state. Hereinafter, these four states will be described in detail.

Mutation State:

When the system is launched, or one of SIP application server instances 110 and 120 completes garbage collection, and the workload for this application server instance has been switched back, the system changes to the mutation state.

In this state, SIP application server instances 110 and 120 run normally. In other words, in this state, the statuses of SIP application server instances 110 and 120 are marked as usable on the target application server instance list in route policy database 234, and dispatcher 232 determines, according to the workloads of SIP application server instances 110 and 120, whether to dispatch service messages to SIP application server instance 110 or 120. On the aspect of SIP application server instances 110 and 120, when a transaction completes, updates the corresponding session-related object in in-memory database 202.

For scheduler 236 in this state, it periodically queries the respective JVM monitors 212 and 222 on JVM of SIP application server instances 110 and 120 about memory usage of JVM and analyzes the obtained memory usage of these JVMs. As mentioned above, based on the memory usage information, scheduler 236 determines which one of JVMs in SIP application server instances 110 and 120 should perform garbage collection.

Pre-Garbage-Collection State:

When scheduler 236 in SIP proxy 130 determines to trigger JVM in SIP application server instance 110 to perform garbage collection, the system enters the pre-garbage-collection state. In this state, scheduler 236 updates route policy database 234 at first. More specifically, scheduler 236 marks the status of SIP application server instance 110 as temporarily unusable on the target application server instance list in route policy database 234.

As described previously, in this embodiment, SIP application server instance 110 serves as PS and SIP application server instance 120 serves as BS.

In this state, according to route policy database 234, dispatcher 232 in SIP proxy 130 dispatches service messages that are for establishing a new session to SIP application server instance 120.

In this state, according to the following criteria, dispatcher 232 dispatches service messages belonging to such a session that is established on SIP application server instance 110:

service messages which are for a new transaction whose corresponding session is on SIP application server instance 110 will be dispatched to SIP application server instance 120 (except CANCEL message which should be dispatched to the SIP application server instance to which the corresponding INVITE message has been dispatched);

all the messages for ongoing transactions on SIP application server instance 110 will still be dispatched to SIP application server instance 110.

In addition, scheduler 236 will query SIP application server instance 110 (e.g. application 204) whether there are uncompleted transactions on SIP application server instance 110 or not. If there is no uncompleted transaction on SIP application server instance 110, i.e. all the transactions have completed, scheduler 236 will send a command to JVM monitor 212 on SIP application server instance 110 to trigger JVM to perform garbage collection.

For SIP application server instance 110 in this state, it will process received messages normally. Every time a transaction completes, it will update the session-related object in in-memory database 202.

For SIP application server instance 120 in this state, it receives both service messages for establishing new sessions and those service messages that are for establishing a new transaction whose corresponding session-related object is not in local. SIP application server instance 120 will query in-memory database 202 to get corresponding session-related object so as to process messages of this kind.

Global Garbage Collection State:

If all the ongoing transactions on SIP application server instance 110 have completed, the system enters the global garbage collection state.

In this state, scheduler 236 will send a command to JVM monitor 212 on SIP application server instance 110 to trigger JVM to perform garbage collection. Then, JVM on SIP application server instance 110 performs garbage collection.

In the period of this state, dispatcher 232 in SIP proxy 130 will send all the messages to SIP application server instance 120, i.e. all the workload is burdened by SIP application server instance 120 temporarily. SIP application server instance 120 processes all the received messages and updates corresponding session-related objects in in-memory database 202 upon completion of each transaction.

In this state, scheduler 236 queries SIP application server instance 110 (e.g. JVM monitor 212) periodically to check whether garbage collection in SIP application server instance 110 has completed.

If scheduler 236 determines that garbage collection in SIP application server instance 110 has completed, the system enters the post-garbage-collection state.

Post-Garbage-Collection State:

In this state, scheduler 236 in SIP proxy 130 will modify route policy database 234 so as to mark the status of SIP application server instance 110 as usable again on the target application server instance list.

Dispatcher 232 in SIP proxy 130 will dispatch messages for establishing a new session based on the workloads of SIP application server instances 110 and 120.

In this state, according to the following criteria, dispatcher 232 dispatches messages belonging to such a session that is established on SIP application server instance 110:

all the messages for a new transaction whose corresponding session is on SIP application server instance 110 will be dispatched to SIP application server instance 110 (except CANCEL message which should be dispatched to the SIP application server instance to which the corresponding INVITE message has been dispatched);

all the messages for ongoing transactions on SIP application server instance 120 will be dispatched to SIP application server instance 120.

In this state, when SIP application server instance 110 receives a message belonging to an ongoing session established thereon, it firstly queries in-memory database 202 to check whether the local session-related object is the same as that in in-memory database 202. If not, SIP application server instance 110 will synchronize the local session-related object with the session-related object in in-memory database 202. Then, SIP application server instance 110 processes the received message and upon completion of the corresponding transaction, updates the session-related object in in-memory database 202.

In addition, scheduler 236 will query SIP application server instance 120 (e.g. application 204) whether or not there are such uncompleted transactions on SIP application server instance 120 that should have been on SIP application server instance 110. If all of such transactions on SIP application server instance 120 have completed, the post-garbage-collection state terminates and the system enters the mutation state again.

FIG. 3 depicts test results, which test is implemented under the following conditions in the environment as depicted in FIG. 2.

Garbage collector: mark-sweep-compact garbage collector;
Memory: 512M
Session-initiating messages are forwarded in the period of garbage collection.

Figure 3A:
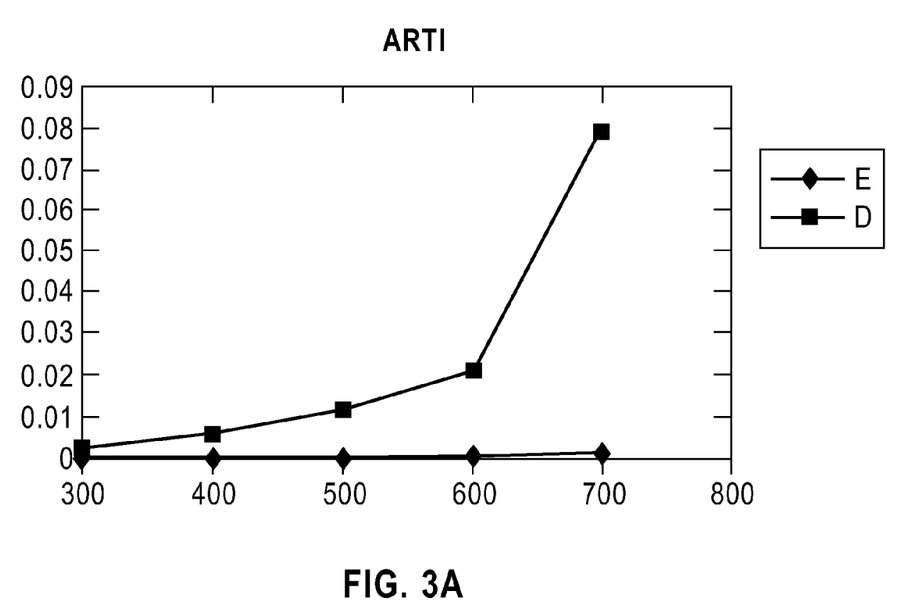
FIG. 3A to 3D depicts test results.

FIG. 3A depicts the average service message processing delay with fixed flux within a test period. In FIG. 3A, the abscissa represents the flux (the unit is the number of transactions/second), the ordinate represents the average service message processing delay (the unit is second), the upper curve represents the case without the adoption of the service message processing method according to the present invention, and the lower curve represents the case with the adoption of the service message processing method according to the present invention. It can be seen that with the adoption of the service message processing method according to the present invention, the average service message processing delay will not increase dramatically even when the flux increases.

Figure 3B:
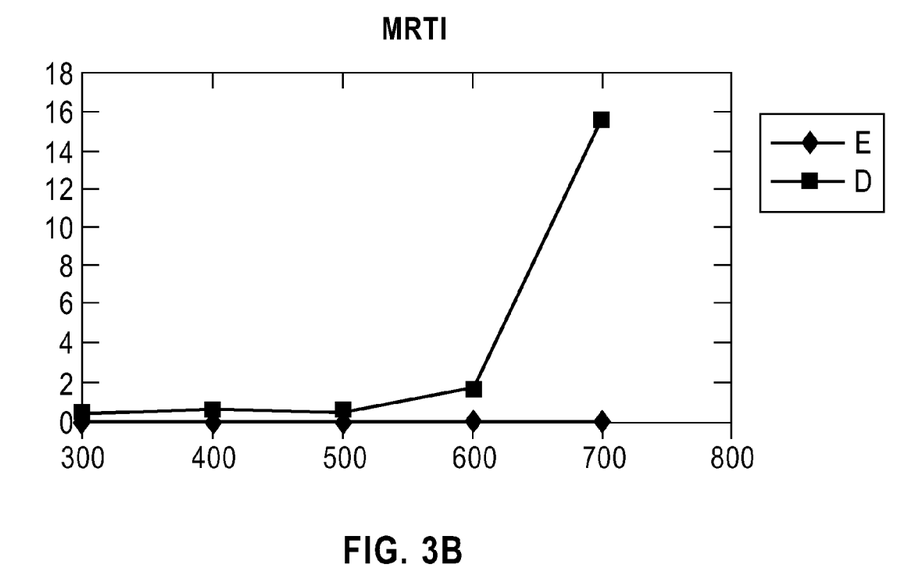

FIG. 3B depicts the maximum service message processing delay with fixed flux within a test period. In this figure, the abscissa represents the flux (the unit is the number of transactions/second), the ordinate represents the maximum service message processing delay (the unit is second), the upper curve represents the case without the adoption of the service message processing method according to the present invention, and the lower curve represents the case with the adoption of the service message processing method according to the present invention. It can be seen that with the adoption of the service message processing method according to the present invention, the maximum service message processing delay will not increase dramatically even when the flux increases.

Figure 3C:
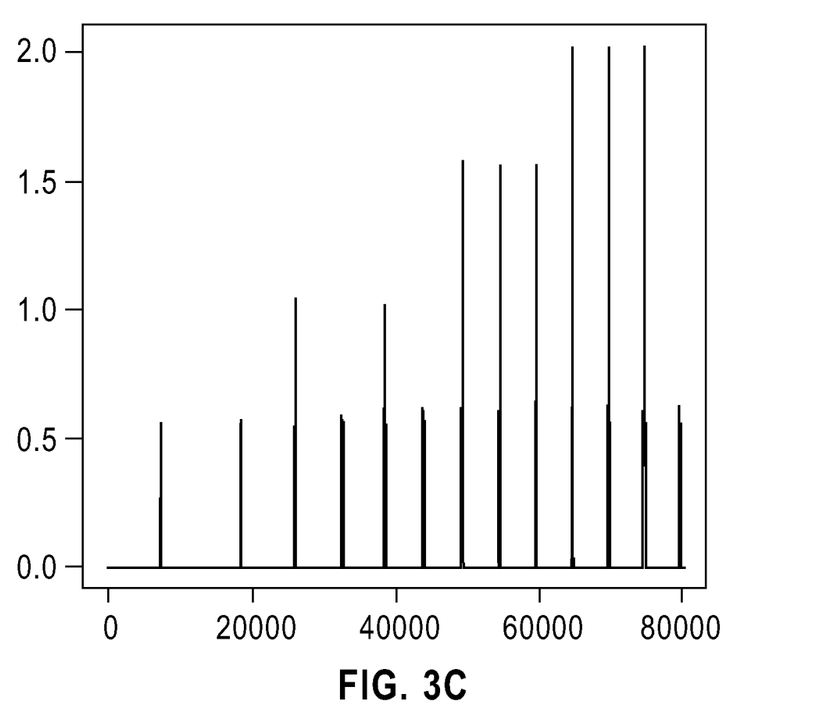
Figure 3D:
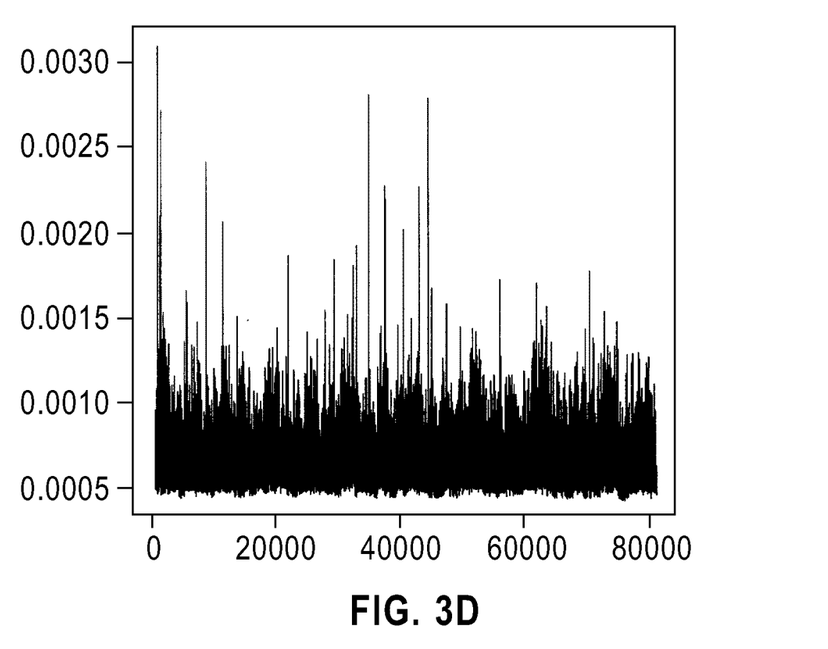

FIG. 3C depicts the response time of each transaction with fixed flux within a test period without the adoption of the service message processing method according to the present invention; and FIG. 3D depicts the response time of each transaction with fixed flux within a test period with the adoption of the service message processing method according to the present invention. In these figures, the abscissa represents the number of a transaction, the ordinate represents the response time (the unit is second). As is clear from FIGS. 3C and 3D, the spikes caused by garbage collection can be reduced dramatically with the adoption of the service message processing method according to the present invention.

The present invention may be further implemented as, for example, a computer program product used by a computer system. Said computer program product is for processing of a series of service messages that is formed by a plurality of service messages, wherein at least two server instances provide real-time processing of said series of service messages and store the information provided by said series of service messages and results obtained from processing of said series service messages. Said computer program product comprises codes used for: determining an activity that affects real-time processing of said series service messages will occur in at least one server instance of said at least two server instances; and dispatching subsequent service messages among said series of service messages to other server instance(s) other than said at least one server instance so as to ensure that said activity will not affect message processing delay.

Such a computer program product may be stored in a storage carrier.

It should be noted that in order to facilitate easier understanding of the present invention, the foregoing description omits more detailed technical details that are well known to those skilled in the art and might be indispensable to the implementation of the present invention.

The specification of the present invention has been presented for purposes of illustration and description, and is not intended to be exhaustive or limit the invention in the form disclosed. Many modifications and variations will be apparent to those ordinary skilled in the art.

Instead of the case in which scheduler 236 gets the above information by queries, it may be the following situation, for example, that SIP application server instances 110 and 120 proactively and periodically report the memory usage of their respective JVMs to scheduler 236; SIP application server instance 110 proactively reports to scheduler 236 that all the transactions have been completed; when garbage collection in SIP application server instance 110 has completed, SIP application server instance 110 proactively notifies scheduler 236 of this information; and SIP application server instance 120 proactively reports to scheduler 236 that there are no such transactions on SIP application server instance 120, wherein the transactions should have been on SIP application server instance 110.

Therefore, the embodiments were chosen and described in order to best explain the principles of the invention, the practical application thereof, and to enable others of ordinary skill in the art to understand that all modifications and alterations made without departing from the spirit of the present invention fall into the protection scope of the present invention as defined in the appended claims.

That which is claimed is:

1. A method for processing of a series of service messages that is formed by a plurality of service messages, at least two server instances provide real-time processing of said series of service messages and store the information provided by said series of service messages and results obtained from processing said series of service messages, said method comprising:

determining, based on memory usage, when at least one server of said at least two server instances will perform an activity that disrupts the ability of said at least one server to process said series of service messages in real-time;

dispatching subsequent service messages among said series of service messages to other server instance(s) other than said at least one server instance, so as to ensure that said activity will not affect message processing delay;

determining said activity when said at least one server instance has been terminated;

modifying route policies so as to dispatch subsequent service messages according to the workloads of said at least two server instances; and said at least two server instances serve as Session Initiation Protocol (SIP) application server instances, and subsequent service messages belonging to such a session that is established on said at least one server instance are dispatched according to the following criteria:

except CANCEL message which should be dispatched to the SIP application server instance to which the corresponding INVITE message has been dispatched, all the subsequent service messages which are for a new transaction whose corresponding session is on said at least one server instance will be dispatched to said at least one server instance;

all the subsequent service messages for ongoing transactions on other server instance(s) other than said at least one server instance will be dispatched to said other instance(s) other than said at least one server instance of said at least two server instances.

2. The method according to claim 1, wherein said information and said results are stored in an in-memory database.

3. The method according to claim 1, wherein in each of said at least two server instances memory is managed by a virtual machine, and said activity includes garbage collection.

4. The method according to claim 3, wherein said determining step comprises:

querying memory usage of the virtual machine of each of said at least two server instances;

comparing the memory usage of the virtual machine of each of said at least two server instances with a threshold, and if the memory usage of the virtual machine of at least one server instance is above said threshold and the memory usage of virtual machine of at least one server instance is below said threshold, then determining that the at least one server instance with memory usage of virtual machine above said threshold will perform garbage collection.

5. The method according to claim 1, further comprising the step of:

after said determining step, modifying route policies to prevent said subsequent service messages from being dispatched to said at least one server instance before said activity in said at least one server instance terminates.

6. The method according to claim 1, further comprising, after said determining step, sending a command to trigger said at least one server instance to perform said activity.

7. The method according to claim 6, wherein said at least two server instances serve as SIP application server instances, said method further comprising:

querying whether there are uncompleted transactions on said at least one server instance or not;

sending said command if there are no uncompleted transactions on said at least one server instance.

8. An apparatus for processing of a series of service messages that is formed by a plurality of service messages, at least two server instances provide real-time processing of said series of service messages and store the information provided by said series of service messages and results obtained from processing said series of service messages, said apparatus comprising:

a computer processor coupled to a memory;

a scheduler to determine, based on memory usage, when at least one server of said at least two server instances will perform an activity that disrupts the ability of said at least one server to process said series of service messages in real-time;

a dispatcher to dispatch subsequent service messages among said series of service messages to other server instance(s) other than said at least one server instance, so as to ensure that said activity will not affect message processing delay;

a route policy database;

said scheduler is further configured to:

determine said activity when said at least one server instance has terminated; and modify route policies in said route policy database so as to dispatch subsequent service messages according to the workloads of said at least two server instances; and said at least two server instances serve as Session Initiation Protocol (SIP) application server instances, and said dispatcher dispatches subsequent service messages belonging to such a session that is established on said at least one server instance according to the following criteria:

except CANCEL message which should be dispatched to the SIP application server instance to which the corresponding INVITE message has been dispatched, all the subsequent service messages which are for a new transaction whose corresponding session is on said at least one server instance will be dispatched to said at least one server instance;

all the subsequent service messages for ongoing transactions on other server instance(s) other than said at least one server instance will be dispatched to the other server instance(s) other than said at least one server instance of said at least two server instances.

9. The apparatus according to claim 8, wherein said information and said results are stored in an in-memory database.

10. The apparatus according to claim 8, wherein in each of said at least two server instances memory is managed by a virtual machine, and said activity includes garbage collection.

11. The apparatus according to claim 10, wherein said scheduler is further used for:

querying memory usage of the virtual machine of each of said at least two server instances;

comparing the memory usage of the virtual machine of each of said at least two server instances with a threshold, and if the memory usage of the virtual machine of at least one server instance is above said threshold and the memory usage of virtual machine of at least one server instance is below said threshold, then determining that the at least one server instance with memory usage of virtual machine above said threshold will perform garbage collection.

12. The apparatus according to claim 8, further comprising a route policy database; and after the scheduler determined that an activity that affects real-time processing of said series of service messages will occur in at least one server instance of said at least two server instances, said scheduler modifies route policies in said route policy database to prevent said subsequent service messages from being dispatched to said at least one server instance before said activity in said at least one server instance terminates.

13. The apparatus according to claim 8, wherein said scheduler is further configured to, after the scheduler determined that an activity that affects real-time processing of said series of service messages will occur in at least one server instance of said at least two server instances, send a command to trigger said at least one server instance to perform said activity.

14. The apparatus according to claim 13, wherein said at least two server instances serve as Session Initiation Protocol (SIP) application server instances, and said scheduler is further configured to:
   query whether there are uncompleted transactions on said at least one server instance or not;
   send said command if there are no uncompleted transactions on said at least one server instance.

15. A system for processing of a series of service messages that is formed by a plurality of service messages, at least two server instances provide real-time processing of said series of service messages and store the information provided by said series of service messages and results obtained from processing said series of service messages, and in each of said at least two server instances, memory is managed by virtual machine, said system comprising:
   a computer processor coupled to a memory;
   a scheduler to determine, based on memory usage, when at least one server of said at least two server instances will perform an activity that disrupts the ability of said at least one server to process said series of service messages in real-time;
   a route policy database to store route policies, wherein after the scheduler determined that an activity that affects real-time processing of said series of service messages will occur in at least one server instance of said at least two server instances, said scheduler modifies route policies in said route policy database so as to prevent subsequent service messages from being dispatched to said at least one server instance;
   a dispatcher to dispatch subsequent service messages among said series of service messages to other server instance(s) other than said at least one server instance by accessing the route policy database, so as to ensure that said activity will not affect message processing delay;
   at least two virtual machine monitors located in each of said at least two server instances respectively and to provide to said scheduler information that is used for determining an activity that affects real-time processing of said series of service messages will occur in at least one server instance of said at least two server instances;
   an in-memory database to store the information provided by said series of service messages and results obtained from processing said series of service messages;
   said scheduler is further configured to:
      determine said activity when said at least one server instance has terminated; and
      modify route policies in said route policy database so as to dispatch subsequent service messages according to the workloads of said at least two server instances; and
   said at least two server instances serve as Session Initiation Protocol (SIP) application server instances, and said dispatcher dispatches subsequent service messages belonging to such a session that is established on said at least one server instance according to the following criteria:
      except CANCEL message which should be dispatched to the SIP application server instance to which the corresponding INVITE message has been dispatched, all the subsequent service messages which are for a new transaction whose corresponding session is on said at least one server instance will be dispatched to said at least one server instance;
      all the subsequent service messages for ongoing transactions on other server instance(s) other than said at least one server instance will be dispatched to the other server instance(s) other than said at least one server instance of said at least two server instances.

16. A computer program product embodied in computer readable memory comprising:
   computer readable program codes coupled to the computer readable memory for processing of a series of service messages that is formed by a plurality of service messages, at least two server instances provide real-time processing of said series of service messages and store the information provided by said series of service messages and results obtained from processing said series of service messages, the computer readable program codes configured to cause the program to:
   determine, based on memory usage, when at least one server of said at least two server instances will perform an activity that disrupts the ability of said at least one server to process said series of service messages in real-time;
   dispatch subsequent service messages among said series of service messages to other server instance(s) other than said at least one server instance, so as to ensure that said activity will not affect message processing delay;
   determine said activity when said at least one server instance has been terminated; and
   modify route policies so as to dispatch subsequent service messages according to the workloads of said at least two server instances; and
   said at least two server instances serve as Session Initiation Protocol (SIP) application server instances, and subsequent service messages belonging to such a session that is established on said at least one server instance are dispatched according to the following criteria:
      except CANCEL message which should be dispatched to the SIP application server instance to which the corresponding INVITE message has been dispatched, all the subsequent service messages which are for a new transaction whose corresponding session is on said at least one server instance will be dispatched to said at least one server instance;
      all the subsequent service messages for ongoing transactions on other server instance(s) other than said at least one server instance will be dispatched to said other instance(s) other than said at least one server instance of said at least two server instances.

* * * * *